(12) United States Patent
Lerg et al.

(10) Patent No.: US 10,730,636 B2
(45) Date of Patent: Aug. 4, 2020

(54) INTEGRATED AIRCRAFT COOLING SYSTEM

(71) Applicant: Rolls-Royce North American Technologies Inc., Indianapolis, IN (US)

(72) Inventors: Bryan H. Lerg, Carmel, IN (US); Kenneth M. Pesyna, Carmel, IN (US); Nilesh Shah, Alexandria, VA (US); Douglas J. Snyder, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 855 days.

(21) Appl. No.: 15/212,469

(22) Filed: Jul. 18, 2016

(65) Prior Publication Data

US 2018/0016020 A1    Jan. 18, 2018

(51) Int. Cl.
| | | |
|---|---|---|
| *B64D 33/08* | (2006.01) | |
| *B64D 13/08* | (2006.01) | |
| *B64D 33/04* | (2006.01) | |

(52) U.S. Cl.
CPC ............ *B64D 33/08* (2013.01); *B64D 13/08* (2013.01); *B64D 33/04* (2013.01); *Y02T 50/44* (2013.01); *Y02T 50/56* (2013.01)

(58) Field of Classification Search
CPC ........ B64D 33/08; B64D 13/08; B64D 33/04; F01D 1/023; F01D 17/141
USPC ........................................................ 415/176
See application file for complete search history.

(56) References Cited

U.S. PATENT DOCUMENTS

| | | | | |
|---|---|---|---|---|
| 5,056,307 | A * | 10/1991 | Liang .................... | B64D 33/04 60/226.1 |
| 2007/0176053 | A1 * | 8/2007 | Bigot .................... | B64D 33/04 244/53 R |
| 2008/0236138 | A1 * | 10/2008 | Gustafsson ............ | B64D 33/04 60/226.1 |
| 2010/0096474 | A1 | 4/2010 | Zhang et al. | |
| 2011/0277448 | A1 * | 11/2011 | Roberts ................. | B64D 29/06 60/226.2 |
| 2012/0073263 | A1 * | 3/2012 | Kohlenberg .......... | B64D 33/04 60/226.3 |
| 2013/0087632 | A1 * | 4/2013 | Germain ................ | F02K 1/36 239/1 |
| 2013/0145745 | A1 * | 6/2013 | Kohlenberg .......... | F04D 29/522 60/226.3 |
| 2014/0216056 | A1 * | 8/2014 | Schwarz ................ | F02K 3/105 60/806 |
| 2015/0121889 | A1 * | 5/2015 | Baker ................... | F02K 1/1215 60/772 |
| 2015/0211441 | A1 | 7/2015 | Moon et al. | |

* cited by examiner

*Primary Examiner* — Aaron R Eastman
(74) *Attorney, Agent, or Firm* — Brinks Gilson & Lione

(57) ABSTRACT

An integrated aircraft cooling system comprising a turbine engine and a plurality of secondary cooling streams, wherein the turbine engine core exhaust stream drives the plurality of secondary cooling streams. A core exhaust stream outlet has a periphery and a composite secondary outlet positioned around the periphery of the core exhaust stream outlet, and the composite secondary outlet is segregated between the plurality of secondary streams. Each of the secondary flows are in fluid isolation from each other upstream of the composite secondary outlet.

12 Claims, 5 Drawing Sheets

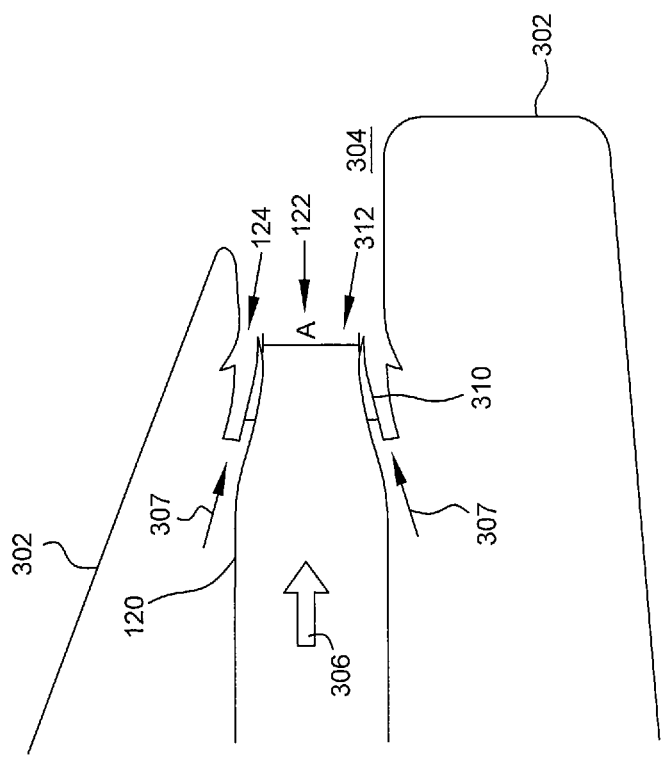

INTEGRATED AIRCRAFT COOLING SYSTEM

FIELD OF THE DISCLOSURE

The present disclosure relates generally to cooling systems, and more specifically to fluid cooling systems adapted for use in aircraft.

BACKGROUND

Fluid systems generating heat loads in an aircraft are typically cooled by heat exchangers and conventional cooling systems. Examples of such fluid systems include hydraulic oil, lubricating oil, air-cooled electronics, air-cooled engine components, engine bay atmospheric air, and the like. In a typical design, each fluid system which requires cooling is provided with a dedicated cooling air duct and blower, which can create significant weight and energy penalties for the aircraft. In other designs, multiple fluid systems are collectively cooled using staged or series ejectors. However, this configuration reduces the driving pressure differential in later stage ejectors and incurs a weight penalty for the aircraft due to increased ducting requirements.

SUMMARY

The present application discloses one or more of the features recited in the appended claims and/or the following features which, alone or in any combination, may comprise patentable subject matter.

According to an aspect of the present disclosure, an aircraft is disclosed having a turbine engine with a turbine engine core exhaust stream and a plurality of secondary streams, wherein the turbine engine core exhaust stream drives the plurality of secondary streams, wherein a core exhaust stream outlet has a periphery and a composite secondary outlet positioned around the periphery of the core exhaust stream outlet, wherein a composite secondary outlet is segregated between the plurality of secondary streams, and wherein each of the secondary flows are in fluid isolation from each other upstream of the composite secondary outlet.

In some embodiments the plurality of secondary streams are coolant streams. In some embodiments the exit area of the composite secondary outlet normal to the core exhaust stream velocity is divided among the plurality of secondary streams. In some embodiments the static pressure of the core exhaust stream is approximately the same proximate to each of the plurality of secondary streams at the composite secondary stream outlet. In some embodiments the static pressure of each of the plurality of secondary streams proximate the composite secondary outlet are approximately equal. In some embodiments the exit areas for each of the plurality of secondary streams respectively in the composite secondary outlet are not equal.

In some embodiments the total pressure of each of the plurality of secondary streams upstream from the composite secondary outlet are not the same. In some embodiments the exit areas for each of the plurality of secondary streams respectively in the composite secondary outlet are equal. In some embodiments the coolant streams are selected from the group consisting of lubricant, hydraulic fluid, and engine fluid. In some embodiments the core exhaust stream outlet and the composite secondary outlet are co-axial. In some embodiments the core exhaust stream outlet and the composite secondary outlet are not co-axial.

According to another aspect of the present disclosure, an ejector pump comprises a driving nozzle; a plurality of secondary channels terminating at a respective plurality of secondary nozzles; wherein the plurality of secondary channels are in fluid isolation from one another; and wherein the plurality of secondary nozzles are arranged adjacently to another around the periphery of the driving nozzle.

In some embodiments the ejector pump further comprises a driving stream and a plurality of secondary streams exiting the driving nozzle and plurality of secondary nozzles respectively, wherein the static pressure of the driving stream proximate the driving nozzle is equal to the respective static pressures of the plurality of secondary streams proximate the secondary nozzles. In some embodiments the exit area of each of the respective plurality of secondary nozzles is the same. In some embodiments the exit area of each of the respective plurality of secondary nozzles are not the same. In some embodiments the static pressure of each of the secondary streams proximate the respective secondary nozzles are not the same. In some embodiments the exit area of each of plurality of secondary nozzles is a function the secondary stream flow requirements. In some embodiments the secondary streams are cooling streams selected from the group consisting of oil cooling, hydraulic cooling and engine cooling.

According to yet another aspect of the present disclosure, a method of pumping a plurality of flows from a common drive stream comprises determining an exit area available for secondary flow exits proximate the periphery the driving flow; determining the static pressure of the driving flow proximate the exit; determining the requirements for each of the secondary flows; locating the secondary exits of the plurality of flows circumferentially about the exit of the common drive flow; and dividing the available exit area between the plurality of secondary flows based at least on the static pressure and the requirements for each of the secondary flows. In some embodiments the method further comprises adjusting the division of available exit area as a function of changing requirements.

BRIEF DESCRIPTION OF THE DRAWINGS

The following will be apparent from elements of the figures, which are provided for illustrative purposes and are not necessarily to scale.

FIG. 3 is a cross-sectional view of an exhaust nozzle of an integrated aircraft cooling system in accordance with some embodiments of the present disclosure.

Figure 1:
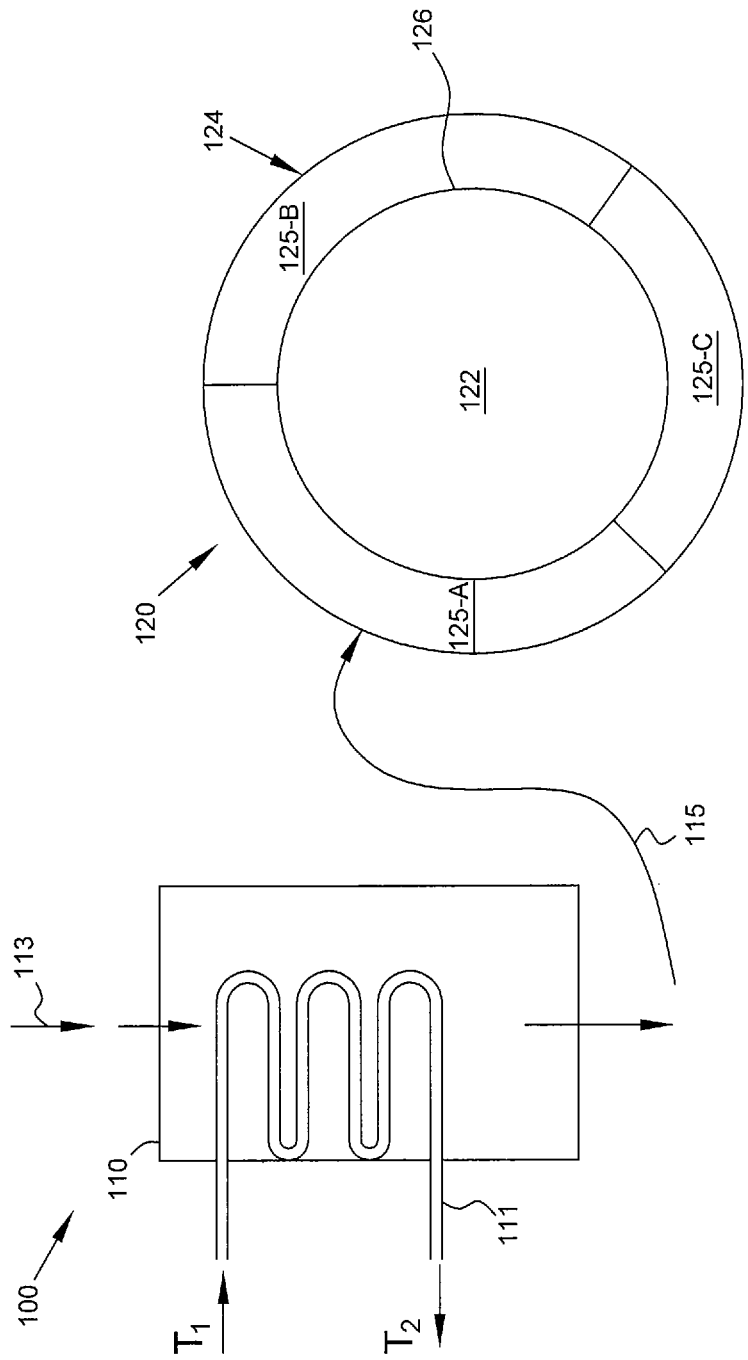
FIG. 1 is a schematic view of an integrated aircraft cooling system in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents systems and methods of operation for an integrated aircraft cooling system which overcomes the deficiencies noted above. More specifically, the present disclosure is directed to a cooling system having a circumferentially segregated ejector type heat exchanger which combines multiple fluid systems requiring cooling into a single heat exchanger for providing cooling.

FIG. 1 is a schematic view of an integrated aircraft cooling system 100 in accordance with some embodiments. Cooling system 100 comprises at least one fluid heat exchanger 110 and exhaust nozzle 120.

Exhaust nozzle 120 comprises a primary flow area 122 and secondary flow area 124. In some embodiments secondary flow area 124 encircles the primary flow area 122. A periphery 126 or radially outer boundary defines the primary flow area 122. Secondary flow area 124 is positioned around the periphery 126. In some embodiments primary flow area 122 and secondary flow area 124 are arranged around the axis of rotation of the turbine engine. In some embodiments the primary flow area 122 and secondary flow area 124 are co-axial.

Primary flow area 122 may also be referred to as the core exhaust stream outlet, as turbine engine core exhaust gasses exit the exhaust nozzle 120 at the primary flow area 122. Secondary flow area 124 may also be referred to as a composite secondary outlet as secondary streams, namely steams of cooling fluids or coolants, exit from the exhaust nozzle 120 at secondary flow area 124.

In some embodiments secondary flow area 124 is circumferentially segregated such that secondary flow area 124 comprises a plurality of segregated flow regions 125-A, 125-B, and 125-C. In some embodiments segregated flow regions 125-A, 125-B, and 125-C are fluidly isolated from each other upstream of the composite secondary outlet.

Figure 2:
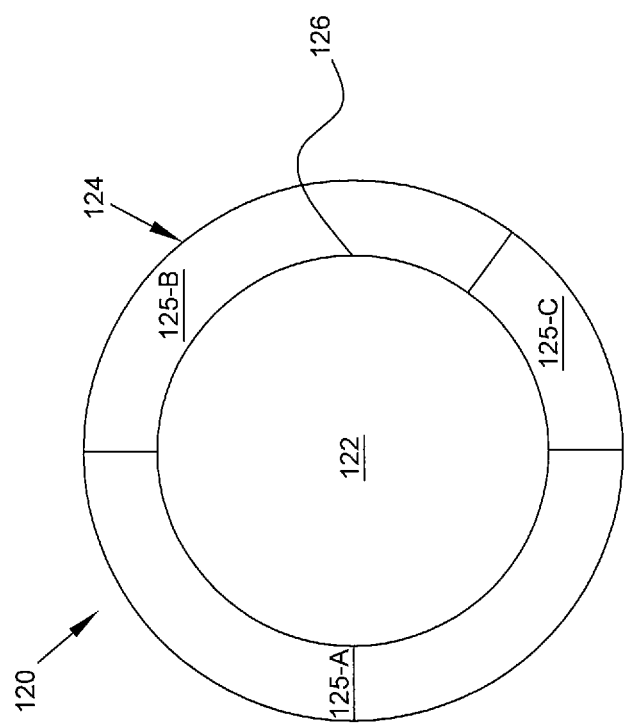
FIG. 2 is a profile view looking from axially aft to forward of an exhaust nozzle of an integrated aircraft cooling system in accordance with some embodiments of the present disclosure.

A cross sectional area of primary flow area 122 and secondary flow area 124 is defined normal to the axis of rotation of the turbine engine or normal to the bulk flow of turbine engine core exhaust gasses, which would be leaving the page as viewed in FIG. 1. The cross sectional area may also be referred to as the exit area. In the secondary flow area 124, the cross sectional area is divided among a plurality of secondary streams. In some embodiments flow regions 125-A, 125-B, and 125-C have an equal cross-sectional area when viewed from axially aft to axially forward as schematically depicted in FIG. 1. In other embodiments, flow regions 125-A, 125-B, and 125-C have unequal cross-sectional areas when viewed from axially aft to axially forward as schematically depicted in FIG. 2. The cross sectional areas may be sized according to secondary stream flow requirements.

In some embodiments heat exchanger 110 comprises a fluid coil 111 configured to receive a working fluid therein. Working fluid enters the fluid coil 111 at a first temperature T1 and exits at a second temperature T2. In some embodiments, first temperature T1 is higher than second temperature T2, indicating that heat is extracted from the working fluid. A secondary fluid flows over the fluid coil 111 as indicated by arrow 113. In some embodiments secondary fluid acts as a heat sink, and secondary fluid may therefore be referred to as a coolant. In some embodiments secondary fluid is air.

As indicated by arrow 115, the secondary fluid exiting the heat exchanger 110 flows to the secondary flow area 124 of exhaust nozzle 120.

Exhaust nozzle 120 forms an ejector. Engine exhaust gasses flowing through primary flow area 122 serves as the motive fluid, passing through the exhaust nozzle 120 to form a low pressure area which creates suction on the secondary flow area 124. The static pressure of the core exhaust stream passing through primary flow area 122 is approximately equal proximate each of the plurality of secondary fluid streams. In some embodiments, the static pressure of the secondary flow streams are approximately equal at all points within the secondary flow area 124.

The disclosed exhaust nozzle 120 having a circumferentially segregated secondary flow area 124 thus supports multiple independent cooling flowpaths. Each flow region 125-A, 125-B, and 125-C can be adapted to receive the secondary fluid of a heat exchanger or the cooling fluid of any heat generating fluid system. Each flow region 125-A, 125-B, and 125-C can be sized to achieve the cooling flow requirements of the heat generating fluid system.

In some embodiments exhaust nozzle 120 comprises a driving nozzle defined by the periphery 126 of primary flow area 122 and a plurality of secondary nozzles 125-A through 125-C arranged adjacent to each other around the periphery 126 of the driving nozzle. The plurality of secondary nozzles 125-A through 125-C may be in fluid isolation from one another. In some embodiments the plurality of secondary nozzles 125-A through 125-C may be fluidly isolated from each other upstream of the secondary flow area 124. A driving stream passes through the driving nozzle to create a region of relatively low pressure. A plurality of secondary streams pass through a respective one of the plurality of secondary nozzles. In some embodiments the static pressure of the driving stream proximate the driving nozzle is less than the respective total pressures of the plurality of secondary streams.

FIG. 3 is a cross-sectional view of an exhaust nozzle 120 of an integrated aircraft cooling system 100 in accordance with some embodiments of the present disclosure. Exhaust nozzle 120 is mounted within airframe 302. In some embodiments, exhaust nozzle 120 comprises an annular flap 310 adapted to vary the cross-sectional area A of the outlet 312 of exhaust nozzle 120. Annular flaps 310 may be variably adjustable during operation of the engine or may be adjustable to a series of fixed positions when the engine is secured.

By adjusting the annular flaps 310 to increase or decrease the cross-sectional area A of the outlet 312, the velocity of engine exhaust gasses exiting the primary flow area 122 is adjusted and thus the differential pressure created between primary flow area 122 and secondary flow area 124 is also adjusted. Altering this differential pressure can create different flow rates through the secondary flow area 124 and thus provide more or less cooling to the various heat generating aircraft systems.

As illustrated in FIG. 3, engine exhaust gasses 306 pass through primary flow area 122 and serve as the motive force of the ejector formed by exhaust nozzle 120. Secondary fluids 307 flow through the secondary flow area 124 under suction force created by the low pressure region generated by engine exhaust gasses passing through the exhaust nozzle 120. Both engine exhaust gasses 306 and secondary fluids 307 exit the exhaust nozzle 120 and flow into an outlet plenum 304 before exiting the airframe 302.

Figure 4A:
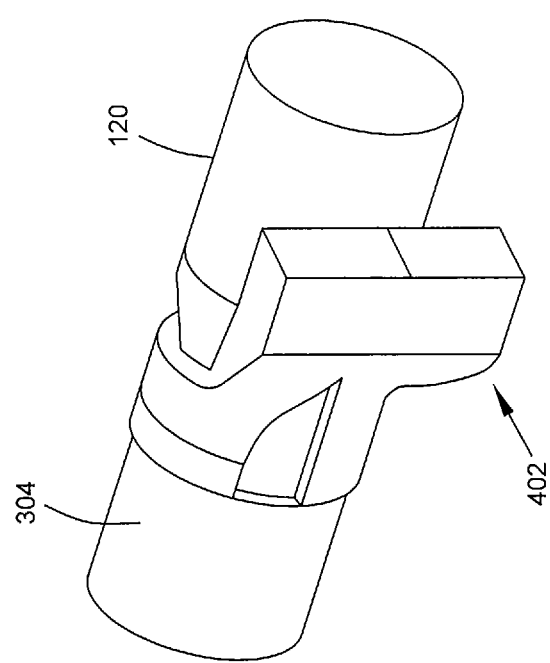
FIG. 4A is an isometric view of an exhaust nozzle and cooling duct of integrated aircraft cooling system in accordance with some embodiments of the present disclosure.

In some embodiments cooling system 100 further comprises a cooling duct 402. FIG. 4A is an isometric view of an exhaust nozzle 120 and cooling duct 402 of integrated aircraft cooling system 100 in accordance with some embodiments of the present disclosure. Cooling duct 402 may be configured to receive atmospheric air from outside the airframe and direct it around the outside of exhaust nozzle 120 to provide cooling to fluids flowing through the exhaust nozzle 120.

The air received by cooling duct 402 is considered tertiary air. In some embodiments the tertiary air passing through cooling duct 402 may be exhausted into outlet plenum 304. In other embodiments the tertiary air passing through cooling duct 402 may be exhausted via an outlet which is separate from outlet plenum 304.

Figure 4B:
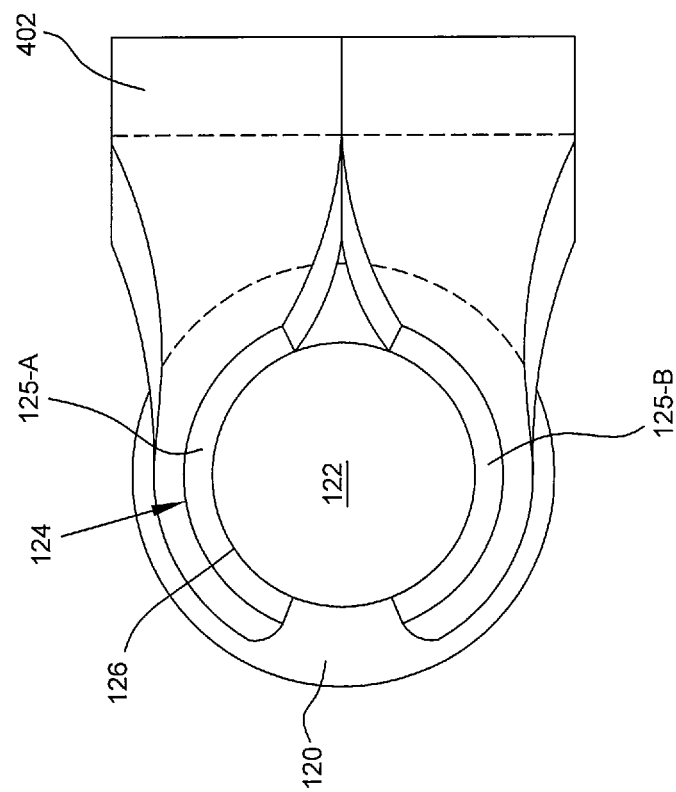
FIG. 4B is a profile view looking from axially aft to forward of an exhaust nozzle of an integrated aircraft cooling system in accordance with some embodiments of the present disclosure.

FIG. 4B is a profile view looking from axially aft to forward of an exhaust nozzle 120 of an integrated aircraft cooling system 100 in accordance with some embodiments of the present disclosure. FIG. 4B illustrates that cooling duct 402 may fully or partially wrap around the exhaust nozzle 120, radially outward of primary flow area 122, and cooling duct 402 may form secondary flow area 124.

FIG. 4B further illustrates that secondary flow area 124 can be divided into any number of flow regions. In the illustrated embodiment, secondary flow area 124 comprises two flow regions, labeled as 125-A and 125-B. In some embodiments each flow region 125 services a different heat generating fluid system. In other embodiments one or more flow regions 125 may service one or more heat generating fluid systems.

Although flow regions 125-A and 125-B are shown of equal cross sectional area, in some embodiments flow regions 125 may have varying or unequal cross sectional areas. The use of unequal cross sectional areas for flow regions 125 allows for close control of the flow rate of secondary cooling air, allowing the secondary fluid systems to provide a desired rate of cooling to heat generating fluid systems onboard the aircraft.

A method is further disclosed for pumping a plurality of flows from a common drive stream. The method comprises the steps of determining an exit area available for secondary flow exits proximate the periphery the driving flow, determining the static pressure of the driving flow proximate the exit, determining the requirements for each of the secondary flows, locating the secondary exits of the plurality of flows circumferentially about the exit of the common drive flow and dividing the available exit area between the plurality of secondary flows based at least on the static pressure and the requirements for each of the secondary flows. In some embodiments the method further comprises the step of adjusting the division of available exit area as a function of changing requirements.

The present disclosure provides many advantages over prior aircraft cooling systems. By combining the cooling flowpaths to provide an integrated cooling system which cools multiple heat generating fluid systems, the disclosed system achieves a significant weight savings. Energy savings may also be achieved where multiple blowers or fans can be eliminated from aircraft cooling systems. The present disclosure additional provides advantageous differential pressures to drive secondary flow as compared to staged or series ejectors.

Although examples are illustrated and described herein, embodiments are nevertheless not limited to the details shown, since various modifications and structural changes may be made therein by those of ordinary skill within the scope and range of equivalents of the claims.

What is claimed is:

1. An aircraft having a turbine engine with a turbine engine core exhaust stream and a plurality of secondary streams, wherein the turbine engine core exhaust stream drives the plurality of secondary streams, wherein a core exhaust stream outlet has a periphery and a composite secondary outlet positioned around the periphery of the core exhaust stream outlet, wherein a composite secondary outlet is segregated between the plurality of secondary streams, and wherein each of the secondary flows are in fluid isolation from each other upstream of the composite secondary outlet.

2. The aircraft of claim 1, wherein the plurality of secondary streams are coolant streams.

3. The aircraft of claim 2, wherein the coolant streams are selected from the group consisting of lubricant, hydraulic fluid, and engine fluid.

4. The aircraft of claim 1, wherein the exit area of the composite secondary outlet normal to the core exhaust stream velocity is divided among the plurality of secondary streams.

5. The aircraft of claim 1, wherein the static pressure of the core exhaust stream is approximately the same proximate to each of the plurality of secondary streams at the composite secondary stream outlet.

6. The aircraft of claim 1, wherein the static pressure of each of the plurality of secondary streams proximate the composite secondary outlet are approximately equal.

7. The aircraft of claim 6, wherein the exit areas for each of the plurality of secondary streams respectively in the composite secondary outlet are not equal.

8. The aircraft of claim 1, wherein the total pressure of each of the plurality of secondary streams upstream from the composite secondary outlet are not the same.

9. The aircraft of claim 8, wherein the exit areas for each of the plurality of secondary streams respectively in the composite secondary outlet are equal.

10. The aircraft of claim 1, wherein the core exhaust stream outlet and the composite secondary outlet are co-axial.

11. The aircraft of claim 1, wherein the core exhaust stream outlet and the composite secondary outlet are not co-axial.

12. The aircraft of claim 1, further comprising a plurality of heat exchangers, each of the plurality of heat exchanges associated with a respective one of the plurality of secondary flows.

* * * * *